(12) United States Patent
Wang et al.

(10) Patent No.: US 10,009,880 B2
(45) Date of Patent: Jun. 26, 2018

(54) METHOD AND APPARATUS FOR ESTABLISHING A MAPPING BETWEEN ENHANCED DOWNLINK CONTROL CHANNEL RESOURCE AND ANTENNA PORT

(71) Applicant: Huawei Device Co., Ltd., Shenzhen (CN)

(72) Inventors: Jian Wang, Beijing (CN); Qiang Wu, Beijing (CN)

(73) Assignee: HUAWEI DEVICE CO., LTD., Shenzhen, Guangdong (CN)

(*) Notice: Subject to any disclaimer, the term of this patent is extended or adjusted under 35 U.S.C. 154(b) by 280 days.

(21) Appl. No.: 14/657,389

(22) Filed: Mar. 13, 2015

(65) Prior Publication Data

US 2015/0189634 A1 Jul. 2, 2015

Related U.S. Application Data

(63) Continuation of application No. PCT/CN2012/081433, filed on Sep. 14, 2012.

(51) Int. Cl.
*H04W 72/04* (2009.01)
*H04L 5/00* (2006.01)
*H04L 27/26* (2006.01)

(52) U.S. Cl.
CPC ......... *H04W 72/042* (2013.01); *H04L 5/0007* (2013.01); *H04L 5/0053* (2013.01);
(Continued)

(58) Field of Classification Search
CPC ..... H04L 5/0053; H04L 5/0023; H04L 5/001; H04L 5/0094; H04L 27/0012;
(Continued)

(56) References Cited

U.S. PATENT DOCUMENTS

| 2010/0238877 A1 | 9/2010 | Nam et al. |
| 2012/0039158 A1* | 2/2012 | Cheng ................. H04B 7/0671 370/203 |

(Continued)

FOREIGN PATENT DOCUMENTS

| CN | 101340227 A | 1/2009 |
| CN | 101645722 A | 2/2010 |

(Continued)

OTHER PUBLICATIONS

"Association between DM-RS ports and ePDCCH transmission," 3GPP TSG RAN WG1 Meeting #70, Qingdao, China, R1-123654, 3rd Generation Partnership Project, Valbonne, France (Aug. 13-17, 2012).

(Continued)

*Primary Examiner* — Asad Nawaz
*Assistant Examiner* — Najeebuddin Ansari
(74) *Attorney, Agent, or Firm* — Womble Bond Dickinson (US) LLP

(57) ABSTRACT

The present invention provides a method and apparatus for establishing a mapping between an enhanced downlink control channel resource and an antenna port. The method includes: establishing a mapping between each resource element in an enhanced downlink control channel resource and an antenna port; and establishing a correspondence between control data carried by the resource element and an antenna port corresponding to the resource element, so as to send or receive, according to a reference signal corresponding to the antenna port, the control data carried by the resource element. The present invention determines a manner for establishing a mapping between a resource on an ePDCCH and an antenna port, and meets a requirement of LTE development.

4 Claims, 9 Drawing Sheets

(52) U.S. Cl.
CPC ........ *H04L 5/0058* (2013.01); *H04L 27/2602* (2013.01); *H04L 27/2627* (2013.01)

(58) Field of Classification Search
CPC . H04W 72/042; H04W 72/044; H04W 88/02; H04W 48/12; H04W 72/04; H04W 24/02; H04W 72/0406–72/0473
See application file for complete search history.

(56) References Cited

U.S. PATENT DOCUMENTS

| | | | | |
|---|---|---|---|---|
| 2013/0044727 A1* | 2/2013 | Nory | ...................... | H04L 5/0092 370/330 |
| 2013/0194931 A1* | 8/2013 | Lee | ...................... | H04L 5/0053 370/241 |
| 2013/0215842 A1* | 8/2013 | Han | ...................... | H04W 72/042 370/329 |
| 2013/0272214 A1* | 10/2013 | Zhu | ...................... | H04W 28/02 370/329 |
| 2014/0064244 A1* | 3/2014 | Kishiyama | .......... | H04W 72/042 370/330 |
| 2014/0071934 A1* | 3/2014 | Frenne | .................... | H04L 5/001 370/330 |
| 2014/0126668 A1* | 5/2014 | Kim | ..................... | H04L 5/0023 375/295 |
| 2014/0293880 A1* | 10/2014 | Frenne | ................. | H04L 1/0072 370/329 |
| 2014/0348126 A1* | 11/2014 | Seo | ....................... | H04L 5/0005 370/330 |
| 2015/0063236 A1* | 3/2015 | Seo | ....................... | H04W 12/00 370/329 |
| 2015/0146640 A1* | 5/2015 | Baldemair | .......... | H04L 27/2666 370/329 |

FOREIGN PATENT DOCUMENTS

| | | |
|---|---|---|
| CN | 102396198 A | 3/2012 |
| EP | 2383928 A2 | 11/2011 |
| WO | WO 2012109542 A1 | 8/2012 |

OTHER PUBLICATIONS

"Mapping of ePDCCH to RE," 3GPP TSG-RAN WG1 #70, Qingdao, China, R1-123614, $3^{rd}$ Generation Partnership Project, Valbonne, France (Aug. 13-17, 2012).

"Discussion on ePDCCH Antenna Port Association," 3GPP TSG-RAN WG1 #70, Qingdao, China, R1-123601, $3^{rd}$ Generation Partnership Project, Valbonne, France (Aug. 13-17, 2012).

"Remaining details on ePDCCH antenna port association," 3GPP TSG-RAN WG1 Meeting #70, Qingdao, China, R1-123587, $3^{rd}$ Generation Partnership Project, Valbonne, France (May 13-17, 2012).

"Antenna port association for ePDCCH," 3GPP TSG RAN WG1 Meeting #70, Qingdao, China, R1-123560, $3^{rd}$ Generation Partnership Project, Valbonne, France (Aug. 13-17, 2012).

"Association between DMRS port and ePDCCH," 3GPP TSG RAN WG1 #70, Qingdao, China, R1-123489, $3^{rd}$ Generation Partnership Project, Valbonne, France (Aug. 13-17, 2012).

"On DMRS port association for enhanced PDCCH," 3GPP TSG RAN WG1 Meeting #70, Qingdao, China, R1-123312, $3^{rd}$ Generation Partnership Project, Valbonne, France (Aug. 13-17, 2012).

"Antenna Port Configuration for ePDCCH Transmissions," 3GPP TSG RAN WG1 #69, Prague, Czech Republic, R1-122738, $3^{rd}$ Generation Partnership Project, Valbonne, France (May 21-25, 2012).

"$3^{rd}$ Generation Partnership Project; Technical Specification Group Radio Access Network; Evolved Universal Terrestrial Radio Access (E-UTRA); Physical Layer Procedures (Release 10)," 3GPP TS 36.213, V10.6.0, pp. 1-125, $3^{rd}$ Generation Partnership Project, Valbonne, France (Jun. 2012).

"$3^{rd}$ Generation Partnership Project; Technical Specification Group Radio Access Network; Evolved Universal Terrestrial Radio Access (E-UTRA); Multiplexing and Channel Coding (Release 10)," 3GPP TS 36.212, V10.6.0, pp. 1-79, $3^{rd}$ Generation Partnership Project, Valbonne, France (Jun. 2012).

"$3^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.5.0, pp. 1-101 $3^{rd}$ Generation Partnership Project, Valbonne, France (Jun. 2012).

"On reference signal design for enhanced control channels," 3GPP TSG-RAN WG1 #68, R1-120076, Dresden, Germany, $3^{rd}$ Generation Partnership Project, Valbonne, France (Feb. 6-10, 2012).

"ePDCCH DMRS," 3GPP TSG RAN WG1 Meeting #68bis, R1-121353, Jeju, Korea, $3^{rd}$ Generation Partnership Project, Valbonne, France (Mar. 26-30, 2012).

"PUCCH ACK/NACK resource allocation for ePDCCH," 3GPP TSG RAN WG1 Meeting #70, R1-123122, Qingdao, China, $3^{rd}$ Generation Partnership Project, Valbonne, France (Aug. 13-17, 2012).

* cited by examiner

| | Frequency domain | | | | | | | | | | | |
|---|---|---|---|---|---|---|---|---|---|---|---|---|
| G1 | A¹ | | | | REx | REx | | | | | REx | REx |
| G2 | B¹ | | | | REx | REx | | | | | REx | REx |
| G3 | A¹ | | | | | | | | | | | |
| G4 | B¹ | | | | | | | | | | | |
| G5 | | B² | | | | | | | | | | |
| G6 | | A² | | | REx | REx | | | | | REx | REx |
| G7 | | B² | | | REx | REx | | | | | REx | REx |
| G8 | | A² | | | | | | | | | | |
| | | | | | | | | | | | | |
| | | | | | | | | | | | | |
| | | | | | REx | REx | | | | | REx | REx |
| | | | | | REx | REx | | | | | REx | REx |

Time domain

FIG. 4

| | Frequency domain | | | | | | | | | | | |
|---|---|---|---|---|---|---|---|---|---|---|---|---|
| G1 | A¹ | | | | REx | REx | | | | | REx | REx |
| G2 | A¹ | | | | REx | REx | | | | | REx | REx |
| G3 | B¹ | | | | | | | | | | | |
| G4 | B¹ | | | | | | | | | | | |
| G5 | | B² | | | | | | | | | | |
| G6 | | B² | | | REx | REx | | | | | REx | REx |
| G7 | | A² | | | REx | REx | | | | | REx | REx |
| G8 | | A² | | | | | | | | | | |
| | | | | | | | | | | | | |
| | | | | | | | | | | | | |
| | | | | | REx | REx | | | | | REx | REx |
| | | | | | REx | REx | | | | | REx | REx |

Time domain

FIG. 5

| Frequency domain | | | | | | | | | | | | | |
|---|---|---|---|---|---|---|---|---|---|---|---|---|---|
| A | B | A | B | A | REx | REx | B | A | B | A | B | REx | REx |
| A | B | A | B | A | REx | REx | B | A | B | A | B | REx | REx |
| A | B | A | B | A | B | A | B | A | B | A | B | A | B |
| A | B | A | B | A | B | A | B | A | B | A | B | A | B |
| A | B | A | B | A | B | A | B | A | B | A | B | A | B |
| A | B | A | B | A | REx | REx | B | A | B | A | B | REx | REx |
| A | B | A | B | A | REx | REx | B | A | B | A | B | REx | REx |
| A | B | A | B | A | B | A | B | A | B | A | B | A | B |
| A | B | A | B | A | B | A | B | A | B | A | B | A | B |
| A | B | A | B | A | B | A | B | A | B | A | B | A | B |
| A | B | A | B | A | REx | REx | B | A | B | A | B | REx | REx |
| A | B | A | B | A | REx | REx | B | A | B | A | B | REx | REx |
| T1 | T2 | T3 | T4 | T5 | T6 | T7 | T8 | | | | | | Time domain |

FIG. 6

| Frequency domain | | | | | | | | | | | | | |
|---|---|---|---|---|---|---|---|---|---|---|---|---|---|
| | A | B | A | B | A | REx | REx | B | A | B | A | B | REx | REx |
| S2 A | B | A | B | A | B | REx | REx | A | B | A | B | REx | REx |
| | A | B | A | B | A | B | A | B | A | B | A | B | A | B |
| | A | B | A | B | A | B | A | B | A | B | A | B | A | B |
| | A | B | A | B | A | B | A | B | A | B | A | B | A | B |
| | A | B | A | B | A | REx | REx | B | A | B | A | B | REx | REx |
| | A | B | A | B | A | REx | REx | B | A | B | A | B | REx | REx |
| | A | B | A | B | A | B | A | B | A | B | A | B | A | B |
| | A | B | A | B | A | B | A | B | A | B | A | B | A | B |
| | A | B | A | B | A | B | A | B | A | B | A | B | A | B |
| | A | B | A | B | A | REx | REx | B | A | B | A | B | REx | REx |
| | A | B | A | B | A | REx | REx | B | A | B | A | B | REx | REx |
| | T1 | T2 | T3 | T4 | T5 | T6 | T7 | T8 | | | | | | Time domain |

FIG. 7

| | | | | | | | | | | | | | |
|---|---|---|---|---|---|---|---|---|---|---|---|---|---|
| S1 | A | B | A | B | A | REx | REx | B | A | B | A | B | REx | REx |
| S2 | B | A | B | A | B | REx | REx | A | B | A | B | A | REx | REx |
| S3 | A | B | A | B | A | B | A | B | A | B | A | B | A | B |
| S4 | B | A | B | A | B | A | B | A | B | A | B | A | B | A |
| S5 | A | B | A | B | A | B | A | B | A | B | A | B | A | B |
| S6 | B | A | B | A | B | REx | REx | A | B | A | B | A | REx | REx |
| S7 | A | B | A | B | A | REx | REx | B | A | B | A | B | REx | REx |
| S8 | B | A | B | A | B | A | B | A | B | A | B | A | B | A |
| | A | B | A | B | A | B | A | B | A | B | A | B | A | B |
| | B | A | B | A | B | A | B | A | B | A | B | A | B | A |
| | A | B | A | B | A | REx | REx | B | A | B | A | B | REx | REx |
| | B | A | B | A | B | REx | REx | A | B | A | B | A | REx | REx |

| | | | | | | | | | | | | | |
|---|---|---|---|---|---|---|---|---|---|---|---|---|---|
| S1 | A | A | A | A | A | REx | REx | A | A | A | A | A | REx | REx |
| S2 | A | A | A | A | A | REx | REx | A | A | A | A | A | REx | REx |
| S3 | A | A | A | A | A | A | A | A | A | A | A | A | A | A |
| S4 | B | B | B | B | B | B | B | B | B | B | B | B | B | B |
| S5 | B | B | B | B | B | B | B | B | B | B | B | B | B | B |
| S6 | B | B | B | B | B | REx | REx | B | B | B | B | B | REx | REx |
| S7 | A | A | A | A | A | REx | REx | A | A | A | A | A | REx | REx |
| S8 | A | A | A | A | A | A | A | A | A | A | A | A | A | A |
| | A | A | A | A | A | A | A | A | A | A | A | A | A | A |
| | B | B | B | B | B | B | B | B | B | B | B | B | B | B |
| | B | B | B | B | B | REx | REx | B | B | B | B | B | REx | REx |
| | B | B | B | B | B | REx | REx | B | B | B | B | B | REx | REx |

FIG. 9

| | T1 | T2 | T3 | T4 | T5 | T6 | T7 | T8 | | | | | |
|---|---|---|---|---|---|---|---|---|---|---|---|---|---|
| S1 | A | A | A | A | A | REx | REx | A | A | A | A | A | REx | REx |
| S2 | A | A | A | A | A | REx | REx | A | A | A | A | A | REx | REx |
| S3 | A | B | A | B | A | B | A | B | A | B | A | B | A | B |
| S4 | B | B | B | B | B | B | B | B | B | B | B | B | B | B |
| S5 | B | B | B | B | B | A | B | B | B | B | B | B | B | A |
| S6 | B | A | B | A | B | REx | REx | A | B | A | B | A | REx | REx |
| S7 | A | A | A | A | A | REx | REx | A | A | A | A | A | REx | REx |
| S8 | A | A | A | A | A | A | A | A | A | A | A | A | A | A |
| | A | B | A | B | A | B | A | B | A | B | A | B | A | B |
| | B | B | B | B | B | A | B | B | B | B | B | B | B | A |
| | B | B | B | B | B | REx | REx | B | B | B | B | B | REx | REx |
| | B | A | B | A | B | REx | REx | A | B | A | B | A | REx | REx |

FIG. 11

| ... | N | N+1 | N+2 | N+3 | N+4 | N+5 | N+6 | N+7 | ... |
|---|---|---|---|---|---|---|---|---|---|
| | | (1) | | (2) | | (3) | | (4) | |

FIG. 12

| ... | N | N+1 | N+2 | N+3 | N+4 | N+5 | N+6 | N+7 | ... |
|---|---|---|---|---|---|---|---|---|---|
| | | (1) | | (3) | | (2) | | (4) | |

FIG. 13

| ... | N | N+1 | N+2 | N+3 | N+4 | N+5 | N+6 | N+7 | ... |
|---|---|---|---|---|---|---|---|---|---|
| | | (1) | | | (3) | (2) | | (4) | |

FIG. 14

| Frequency domain | | | | | | | | | | | | | |
|---|---|---|---|---|---|---|---|---|---|---|---|---|---|
| A | B | C | D | A | REx | REx | D | A | B | C | D | REx | REx |
| A | B | C | D | A | REx | REx | D | A | B | C | D | REx | REx |
| A | B | C | D | A | B | C | D | A | B | C | D | A | B |
| A | B | C | D | A | B | C | D | A | B | C | D | A | B |
| A | B | C | D | A | B | C | D | A | B | C | D | A | B |
| A | B | C | D | A | REx | REx | D | A | B | C | D | REx | REx |
| A | B | C | D | A | REx | REx | D | A | B | C | D | REx | REx |
| A | B | C | D | A | B | C | D | A | B | C | D | A | B |
| A | B | C | D | A | B | C | D | A | B | C | D | A | B |
| A | B | C | D | A | B | C | D | A | B | C | D | A | B |
| A | B | C | D | A | REx | REx | D | A | B | C | D | REx | REx |
| A | B | C | D | A | REx | REx | D | A | B | C | D | REx | REx |
T1　T2　T3　T4　T5　T6　T7　T8　　　　　　　　　　　Time domain
FIG. 15
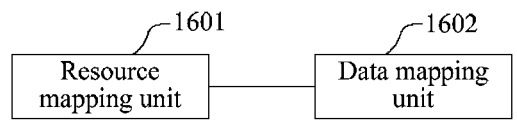
FIG. 16
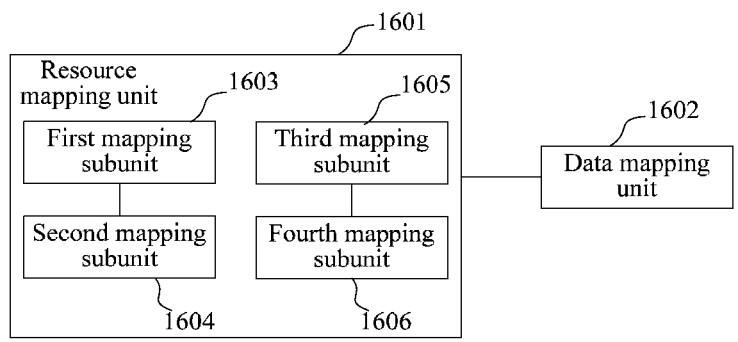
FIG. 17

METHOD AND APPARATUS FOR ESTABLISHING A MAPPING BETWEEN ENHANCED DOWNLINK CONTROL CHANNEL RESOURCE AND ANTENNA PORT

CROSS-REFERENCE TO RELATED APPLICATIONS

This application is a continuation of International Patent Application No. PCT/CN2012/081433, filed on Sep. 14, 2012, which is hereby incorporated by reference in its entirety.

TECHNICAL FIELD

The present invention relates to Long Term Evolution (Long Term Evolution, LTE for short) technologies, and in particular, to a method and apparatus for establishing a mapping between an enhanced downlink control channel resource and an antenna port.

BACKGROUND

In an LTE system, control data used to assist service data demodulation is transmitted on a physical downlink control channel (Physical Downlink Control Channel, PDCCH for short) and generally in an orthogonal frequency division multiplexing (Orthogonal Frequency Division Multiplexing, OFDM for short) manner. The PDCCH includes resources distributed in a time domain and a frequency domain, and may be referred to as a downlink control channel resource (briefly referred to as a downlink resource). The downlink resource is divided into multiple OFDM symbols in the time domain, and is divided into multiple subcarriers in the frequency domain. A subcarrier in an OFDM symbol is referred to as a resource element (Resource Element, RE for short). When transmitting control data to a terminal in the downlink, a base station needs to establish a mapping relationship between an RE that carries the control data and an antenna port, so that the base station can match the control data carried by the RE with the antenna port according to the mapping relationship, and modulate and send the control data by using a reference signal of the antenna port. On a terminal side, the control data carried by the RE also needs to be demodulated according to the mapping relationship by using the reference signal corresponding to the antenna port corresponding to the RE.

In the prior art, for example, in the LTE Release 8/9/10, control data in each subframe is carried by REs in the first several OFDM symbols in the subframe, and REs in remaining OFDM symbols are used to carry service data. As LTE technologies are evolving to the LTE Release 11/12, the capacity of a downlink control channel needs to increase, so does the need to use an entire subframe, instead of several OFDM symbols, to transmit control data. Such a control channel may be referred to as an enhanced physical downlink control channel (Enhanced PDCCH, ePDCCH for short). However, it is not yet explicitly defined in which manner a mapping is established between a resource on the ePDCCH (which may be referred to as an enhanced downlink control channel resource) and an antenna port, which hinders LTE development.

SUMMARY

The present invention provides a method and apparatus for establishing a mapping between an enhanced downlink control channel resource and an antenna port, so as to determine a manner for establishing a mapping between a resource on an ePDCCH and an antenna port, and meet a requirement of LTE development.

The present invention provides a method for establishing a mapping between an enhanced downlink control channel resource and an antenna port, including:

establishing a mapping between each resource element in a enhanced downlink control channel resource and an antenna port; and establishing a correspondence between control data carried by the resource element and an antenna port corresponding to the resource element, so as to send or receive, according to a reference signal corresponding to the antenna port, the control data carried by the resource element.

In a possible implementation, one resource block pair PRB pair in the enhanced downlink control channel resource includes multiple resource element groups, and each of the resource element groups includes multiple resource elements; and the establishing a mapping between each resource element in an enhanced downlink control channel resource and an antenna port includes that: in each of the resource element groups, antenna ports corresponding to the resource elements in the resource element group are in rotation according to an order of logical indexes of the multiple resource elements.

In another possible implementation, the establishing a mapping between each resource element in an enhanced downlink control channel resource and an antenna port further includes that: in the multiple resource element groups, antenna ports corresponding to the resource elements that have a same logical index but belong to different resource element groups are the same.

In still another possible implementation, the establishing a mapping between each resource element in an enhanced downlink control channel resource and an antenna port further includes that: in the multiple resource element groups, antenna ports corresponding to the resource elements that have a same logical index but belong to different resource element groups are on a preset rotating cycle according to an order of logical indexes of the resource element groups.

In still another possible implementation, one resource block pair PRB pair in the enhanced downlink control channel resource includes multiple orthogonal frequency division multiplexing OFDM symbols in a time domain, each of the OFDM symbols includes multiple resource elements, and each of the resource elements corresponds to a subcarrier in a frequency domain; and the establishing a mapping between each resource element in an enhanced downlink control channel resource and an antenna port includes: determining a mapping between the resource element and an antenna port according to a physical index, where the physical index includes an OFDM symbol index corresponding to the OFDM symbol, and a subcarrier index corresponding to the subcarrier.

In still another possible implementation, the determining a mapping between the resource element and an antenna port according to a physical index includes that: in each of the OFDM symbols, antenna ports corresponding to all the resource elements included in the OFDM symbol are the same; and in the multiple OFDM symbols, antenna ports corresponding to the resource elements in different OFDM symbols are on a preset rotating cycle according to an order of the OFDM symbol indexes in the time domain.

In still another possible implementation, after that antenna ports corresponding to all the resource elements included in each of the OFDM symbols are the same and antenna ports corresponding to the resource elements in different OFDM symbols are on a preset rotating cycle, the method further includes: performing a cyclic shift, in the time domain, for antenna ports corresponding to multiple resource elements corresponding to some subcarrier indexes in the frequency domain.

In still another possible implementation, the determining a mapping between the resource element and an antenna port according to a physical index includes that: antenna ports corresponding to multiple resource elements that correspond to a same subcarrier index are the same; and antenna ports corresponding to different resource elements that correspond to different subcarrier indexes are on a preset rotating cycle according to an order of the subcarrier index in the frequency domain.

In still another possible implementation, after that antenna ports corresponding to multiple resource elements that correspond to a same subcarrier index are the same and antenna ports corresponding to different resource elements are on a preset rotating cycle, the method further includes: performing a cyclic shift, in the frequency domain, for antenna ports corresponding to multiple resource elements corresponding to some OFDM symbol indexes in the time domain.

In still another possible implementation, the enhanced downlink control channel resource includes multiple PRB pairs; and each of the PRB pairs undergoes the step of establishing a mapping between each resource element in an enhanced downlink control channel resource and an antenna port, where the multiple PRB pairs have a same mapping between the resource element and an antenna port.

In still another possible implementation, the enhanced downlink control channel resource includes multiple PRB pairs; and each of the PRB pairs undergoes the step of establishing a mapping between each resource element in an enhanced downlink control channel resource and an antenna port; and in the multiple PRB pairs, antenna ports corresponding to resource elements at corresponding locations in different PRB pairs are on a preset rotating cycle according to an order of physical indexes of the PRB pairs in the frequency domain.

In still another possible implementation, the enhanced downlink control channel resource includes multiple PRB pairs; and each of the PRB pairs undergoes the step of establishing a mapping between each resource element in an enhanced downlink control channel resource and an antenna port; and in the multiple PRB pairs, antenna ports corresponding to resource elements at corresponding locations in different PRB pairs are on a preset rotating cycle according to an order of logical indexes of the PRB pairs in the enhanced downlink control channel resource.

The present invention provides an apparatus for establishing a mapping between an enhanced downlink control channel resource and an antenna port, including:

a resource mapping unit, configured to establish a mapping between each resource element in a enhanced downlink control channel resource and an antenna port; and a data mapping unit, configured to establish a correspondence between control data carried by the resource element and an antenna port corresponding to the resource element, so as to send or receive, according to a reference signal corresponding to the antenna port, the control data carried by the resource element.

In a possible implementation, one resource block pair PRB pair in the enhanced downlink control channel resource includes multiple resource element groups, and each of the resource element groups includes multiple resource elements; and the resource mapping unit is specifically configured to set that in each of the resource element groups, antenna ports corresponding to the resource elements in the resource element group are in rotation according to an order of logical indexes of the multiple resource elements.

In another possible implementation, the resource mapping unit is further configured to set that in the multiple resource element groups, antenna ports corresponding to the resource elements that have a same logical index but belong to different resource element groups are the same.

In still another possible implementation, the resource mapping unit is further configured to set that in the multiple resource element groups, antenna ports corresponding to the resource elements that have a same logical index but belong to different resource element groups are on a preset rotating cycle according to an order of logical indexes of the resource element groups.

In still another possible implementation, one resource block pair PRB pair in the enhanced downlink control channel resource includes multiple orthogonal frequency division multiplexing OFDM symbols in a time domain, each of the OFDM symbols includes multiple resource elements, and each of the resource elements corresponds to a subcarrier in a frequency domain; and the resource mapping unit is specifically configured to determine a mapping between the resource element and an antenna port according to a physical index, where the physical index includes an OFDM symbol index corresponding to the OFDM symbol, and a subcarrier index corresponding to the subcarrier.

In still another possible implementation, the resource mapping unit includes any one or multiple of: a first mapping subunit, a second mapping subunit, a third mapping subunit, and a fourth mapping subunit, where the first mapping subunit is configured to set that in each of the OFDM symbols, antenna ports corresponding to all the resource elements included in the OFDM symbol are the same; and in the multiple OFDM symbols, antenna ports corresponding to the resource elements in different OFDM symbols are on a preset rotating cycle according to an order of the OFDM symbol indexes in the time domain; the second mapping subunit is configured to: after processing performed by the first mapping subunit, set that a cyclic shift is performed, in the time domain, for antenna ports corresponding to multiple resource elements corresponding to some subcarrier indexes in the frequency domain; the third mapping subunit is configured to set that antenna ports corresponding to multiple resource elements that correspond to a same subcarrier index are the same; and antenna ports corresponding to different resource elements that correspond to different subcarrier indexes are on a preset rotating cycle according to an order of the subcarrier indexes in the frequency domain; and the fourth mapping subunit, configured to: after processing performed by the third mapping subunit, set that a cyclic shift is performed, in the frequency domain, for antenna ports corresponding to multiple resource elements corresponding to some OFDM symbol indexes in the time domain.

In still another possible implementation, the enhanced downlink control channel resource includes multiple PRB pairs; and the resource mapping unit is configured to perform, for each of the PRB pairs, the step of establishing a mapping between each resource element in an enhanced downlink control channel resource and an antenna port; and is further configured to set that the multiple PRB pairs have a same mapping between the resource element and an antenna port.

In still another possible implementation, the enhanced downlink control channel resource includes multiple PRB pairs; and the resource mapping unit is configured to perform, for each of the PRB pairs, the step of establishing a mapping between each resource element in an enhanced downlink control channel resource and an antenna port; and is further configured to set that in the multiple PRB pairs, antenna ports corresponding to resource elements at corresponding locations in different PRB pairs are on a preset rotating cycle according to an order of physical indexes or logical indexes of the PRB pairs.

The present invention provides an apparatus for establishing a mapping between an enhanced downlink control channel resource and an antenna port, including:

a processor, configured to establish a mapping between each resource element in an enhanced downlink control channel resource and an antenna port, and establish a correspondence between control data carried by the resource element and an antenna port corresponding to the resource element; and a memory, configured to store the mapping established between each resource element and an antenna port by the processor and to store the correspondence established between the control data and an antenna port by the processor.

The method and apparatus for establishing a mapping between an enhanced downlink control channel resource and an antenna port provided in the present invention have the following technical effect: A mapping between each RE and an antenna port is established, an RE corresponding to a location in a time domain and a frequency domain is bound to an antenna port, and a manner for establishing a mapping between a resource in an ePDCCH and an antenna port is determined, so that a requirement of LTE development is met.

BRIEF DESCRIPTION OF DRAWINGS

FIG. 4 shows an antenna port mapping table in still another embodiment of a method for establishing a mapping between an enhanced downlink control channel resource and an antenna port according to the present invention;

FIG. 5 shows an antenna port mapping table in still another embodiment of a method for establishing a mapping between an enhanced downlink control channel resource and an antenna port according to the present invention;

FIG. 6 shows an antenna port mapping table in still another embodiment of a method for establishing a mapping between an enhanced downlink control channel resource and an antenna port according to the present invention;

FIG. 7 is a schematic diagram depicting a cyclic shift of antenna ports in still another embodiment of a method for establishing a mapping between an enhanced downlink control channel resource and an antenna port according to the present invention;

FIG. 8 shows an antenna port mapping table in still another embodiment of a method for establishing a mapping between an enhanced downlink control channel resource and an antenna port according to the present invention;

FIG. 9 shows an antenna port mapping table in still another embodiment of a method for establishing a mapping between an enhanced downlink control channel resource and an antenna port according to the present invention;

FIG. 11 shows an antenna port mapping table in still another embodiment of a method for establishing a mapping between an enhanced downlink control channel resource and an antenna port according to the present invention;

FIG. 12 is a schematic diagram depicting distribution of PRB pairs in still another embodiment of a method for establishing a mapping between an enhanced downlink control channel resource and an antenna port according to the present invention;

FIG. 13 is a schematic diagram depicting distribution of PRB pairs in still another embodiment of a method for establishing a mapping between an enhanced downlink control channel resource and an antenna port according to the present invention;

FIG. 14 is a schematic diagram depicting distribution of PRB pairs in still another embodiment of a method for establishing a mapping between an enhanced downlink control channel resource and an antenna port according to the present invention;

FIG. 15 shows an antenna port mapping table in still another embodiment of a method for establishing a mapping between an enhanced downlink control channel resource and an antenna port according to the present invention;

FIG. 16 is a schematic structural diagram of an embodiment of an apparatus for establishing a mapping between an enhanced downlink control channel resource and an antenna port according to the present invention;

FIG. 17 is a schematic structural diagram of another embodiment of an apparatus for establishing a mapping between an enhanced downlink control channel resource and an antenna port according to the present invention.

DESCRIPTION OF EMBODIMENTS

Figure 1:
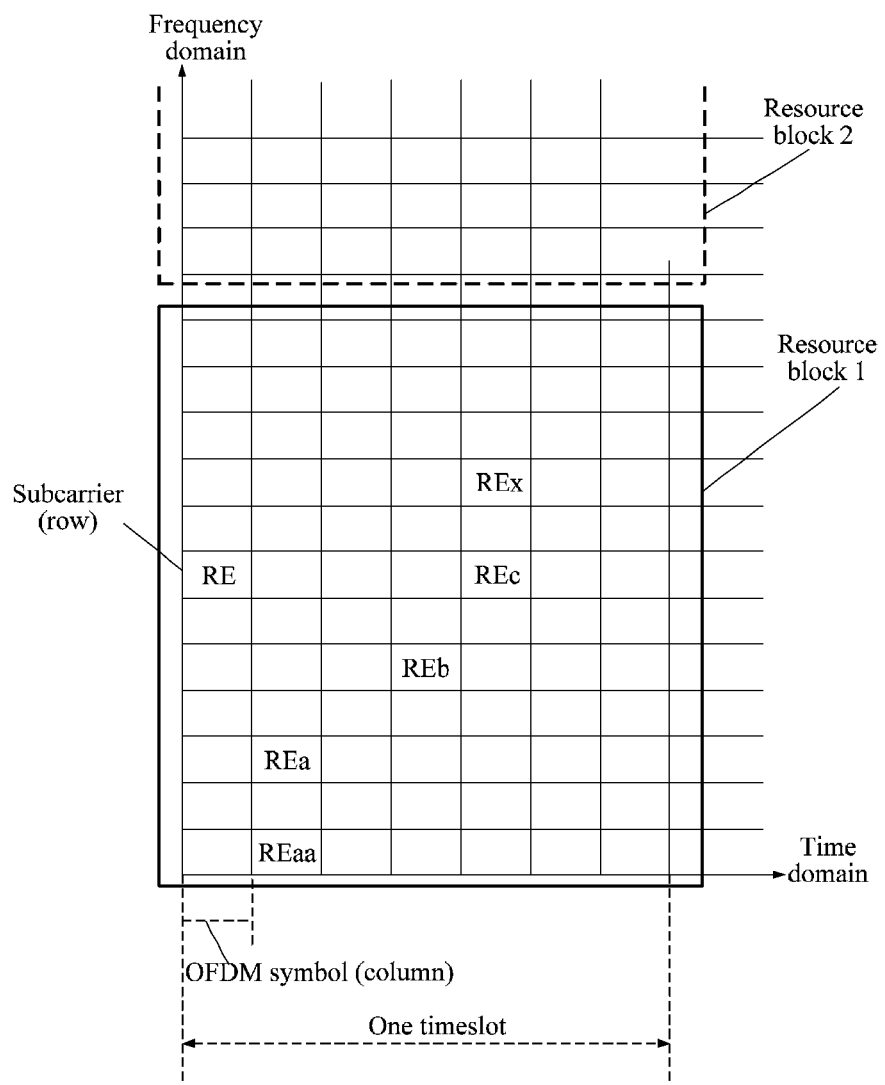
FIG. 1 is a schematic diagram of resource division in an embodiment of a method for establishing a mapping between an enhanced downlink control channel resource and an antenna port according to the present invention.

Before describing a method for establishing a mapping between an enhanced downlink control channel resource and an antenna port in embodiments of the present invention, some basic concepts are introduced to help understand the mapping method:

Enhanced downlink control channel resource: When sending service data to a terminal in the downlink, a base station generally also sends control data used to assist a terminal side in demodulating and acquiring the service data; and the control data is transmitted on a downlink control channel. The downlink control channel includes a downlink control channel resource, and in fact, the control data is carried by the resource. For an enhanced downlink control channel resource, refer to FIG. 1. FIG. 1 is a schematic diagram of resource division in an embodiment of a method for establishing a mapping between an enhanced downlink control channel resource and an antenna port according to the present invention. Some concepts regarding the resource are described with reference to FIG. 1 as follows:

OFDM symbol: A downlink control channel resource is broken into multiple segments in a time domain, and each segment may be referred to as an OFDM symbol, which is shown as a column in FIG. 1.

Subcarrier: The resource is divided into multiple subcarriers in a frequency domain, which is shown as a row in FIG. 1.

Resource element RE: After the foregoing division into OFDM symbols and subcarriers, in fact, an enhanced downlink control channel resource is divided into time-frequency grid units as shown in FIG. 1, where a subcarrier corresponding to an OFDM symbol is referred to as a resource element RE, and is equivalent to one grid unit; and as can be seen from FIG. 1, one OFDM symbol includes multiple REs.

Subframe and resource: A downlink subframe is used as an example. Each downlink subframe includes two timeslots, and each timeslot has 7 or 6 OFDM symbols. In other words, each downlink subframe has 14 or 12 OFDM symbols in total. FIG. 1 only shows one timeslot, and by way of example, the one timeslot includes 7 OFDM symbols.

Resource block (Resource Block, RB for short): One RB includes 12 subcarriers in the frequency domain, and is equal to one timeslot in the time domain, namely, 7 or 6 OFDM symbols. In other words, one RB may include 84 or 72 REs. In FIG. 1, a resource block 1 is completely shown, with 84 Res in total, whereas a resource block 2 is partially shown.

Resource block pair (PRB pair): One subframe has two timeslots, and therefore includes two RBs. The two RBs may be referred to as a resource block pair PRB pair. A downlink control channel resource may include 1 PRB pair, or may include multiple PRB pairs.

Enhanced resource element group (Enhanced Resource Element Group, eREG for short): The mapping method in the embodiments of the present invention is directed to an enhanced physical downlink control channel ePDCCH, and therefore, a corresponding resource element group is an enhanced resource element group eREG. One PRB pair in a subframe includes multiple eREGs, for example, every 9 REs form one eREG.

It should be noted that in the aforementioned enhanced downlink control channel resource, not all REs are used to carry control data, and some REs are dedicated to carrying a reference signal corresponding to an antenna port. The reference signal is mainly used to modulate control data at a sender and to demodulate the control data at a receiver. For example, the REx shown in FIG. 1 are exclusively used to carry a reference signal, and generally their locations in the time domain and the frequency domain are predefined. In addition, the control data may be sent through multiple antenna ports, and correspondingly REs that are separately used to bear different reference signals are also included. For example, 4 REs whose locations are predefined may be set to be used to bear reference signals corresponding to different antenna ports.

Mapping between an enhanced downlink control channel resource and an antenna port: As described above, control data needs to be coded and modulated prior to being sent by a sender, and a reference signal associated with the control data is sent by using a coding and modulating scheme that is applied to the control data. When the control data is received by a receiver, it needs to be demodulated by using the reference signal. In other words, when the control data is carried by an RE, an antenna port has to be determined so that the control data will be modulated or demodulated by using a reference signal corresponding to the antenna port. The determining is equivalent to determining a correspondence between the RE that carries the control data and the antenna port. For example, assuming that the control data is carried by a first RE and the first RE corresponds to an antenna port A, it indicates that the control data carried by the first RE needs to be modulated or demodulated by using a reference signal of the antenna port A.

Based on the foregoing description, the mapping method in the embodiments of the present invention is described in detail below. The method mainly describes how to determine a mapping between an enhanced downlink control channel resource and an antenna port.

Embodiment 1

Figures 2, 3:
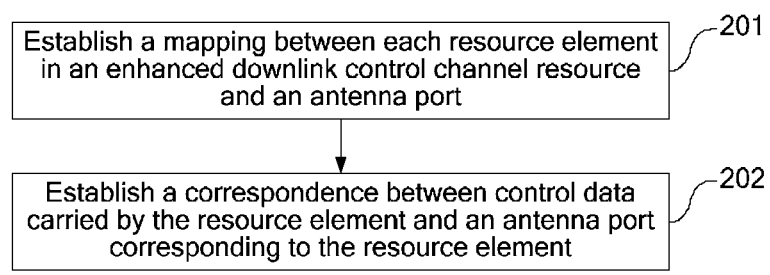
FIG. 2 is a schematic flowchart illustrating an embodiment of a method for establishing a mapping between an enhanced downlink control channel resource and an antenna port according to the present invention.
FIG. 3 shows an antenna port mapping table in another embodiment of a method for establishing a mapping between an enhanced downlink control channel resource and an antenna port according to the present invention.

FIG. 2 is a schematic flowchart illustrating an embodiment of a method for establishing a mapping between an enhanced downlink control channel resource and an antenna port according to the present invention. As shown in FIG. 2, the method may include:

201. Establish a mapping between each resource element in an enhanced downlink control channel resource and an antenna port.

In this embodiment, it needs to determine a mapping relationship between all resource elements REs in an enhanced downlink control channel resource and antenna ports, rather than merely determine a mapping relationship between some REs and antenna ports. For example, if a downlink control channel occupies one PRB pair, a mapping relationship is established between all REs in the PRB pair that are used to carry control data and antenna ports.

The establishing a mapping relationship between an RE and an antenna port means that: for example, if an RE is mapped to an antenna port A, it indicates that control data carried by the RE is to be demodulated by using a reference signal corresponding to the antenna port A.

A mapping relationship established in this embodiment is a mapping between an RE and an antenna port, specifically, an RE corresponding to a time domain location and a frequency domain location is bound to an antenna port; for example, a mapping between an RE and an antenna port may be set according to an index, where the index may be a logical index or a physical index, and a specific mapping manner is described in detail in subsequent embodiments.

202. Establish a correspondence between control data carried by the resource element and an antenna port corresponding to the resource element.

A main objective of establishing a mapping between an enhanced downlink control channel resource and an antenna port is to establish a correspondence between control data carried by the resource and an antenna port, so as to modulate the control data according to a reference signal corresponding to the antenna port prior to sending the control data, or demodulate received control data according to a reference signal corresponding to the antenna port.

Multiple available manners of establishing a mapping between each RE and an antenna port are separately described below. The following description starts with examples of how to establish a mapping between resource elements in one PRB pair and antenna ports. Then, attention is directed towards establishing a mapping between resource elements in a distributed downlink control channel occupying multiple PRB pairs and antenna ports.

Embodiment 2

FIG. 3 shows an antenna port mapping table in another embodiment of a method for establishing a mapping between an enhanced downlink control channel resource and an antenna port according to the present invention. As shown in FIG. 3, this embodiment provides an example of establishing a mapping between resource elements in one PRB pair and antenna ports. In this example, one subframe includes 14 OFDM symbols in a time domain.

Assuming that control data in this embodiment is sent through two antenna ports, for example, through an antenna port A and an antenna port B, each RE needs to correspond to the antenna port A or the antenna port B. In FIG. 3, an REx is used to carry a reference signal of an antenna port and has a fixed location, and further description thereof is not provided herein. Resource elements, other than these REs dedicated to carrying a reference signal, are used to carry control data. This embodiment focuses on describing a manner for establishing a mapping between an RE in a control data bearing area and an antenna port.

Since the mapping manner in this embodiment is relevant to a logical index of an RE, it is necessary to have some idea of what a logical index of an RE is. As described above, one PRB pair includes multiple eREGs. In this embodiment, the PRB pair includes 16 eREGs, and each eREG includes 9 REs. Referring to FIG. 3, it is assumed that nine REs (which are shown as being shaded with diagonal lines) marked with $A_1$, $B_2$, $A_3$, $B_4$, $A_5$, $B_6$, $A_7$, $B_8$, and $A_9$ belong to a same eREG, that is to say, they comprise one of eREGs in the PRB pair. The eREG includes nine REs, and the nine REs are arranged in a sequence according to their logical indexes, the sequence is equivalent to a logical sequence, and is irrelevant to physical locations (locations corresponding to the time domain and a frequency domain) of the REs; for example, "1, 2, . . . , and 9" in the foregoing $A_1$ to $A_9$ are logical indexes of the REs, and "A" and "B" therein represent antenna ports to which the REs correspond.

In an example: $A_1$ indicates that the RE marked with $A_1$ is an RE being the first in the sequence where REs in the eREG are listed in order of their logical indexes, and an antenna port corresponding to the RE is the antenna port A. If control data is carried in the RE, the control data needs to be processed according to a reference signal of the antenna port A. Similarly, $B_4$ indicates that the RE marked with $B_4$ is an RE being the fourth in the sequence where REs in the eREG are listed in order of their logical indexes, and an antenna port corresponding to the RE is the antenna port B.

The manner of establishing a mapping between an RE and an antenna port in this embodiment is as follows: In each eREG, antenna ports corresponding to multiple REs are in rotation according to an order of logical indexes of the REs. Referring again to FIG. 3, apparently, the REs in the aforementioned eREG are listed in a sequence according to their logical indexes "1, 2, . . . , and 9", and antenna ports are in rotation, specifically, the rotation pattern is "A, B, A, B, . . . ". The mapping manner of REs in other eREGs in the PRB pair are the same as the mapping manner of the foregoing eREG, and details are not described again.

Further, in addition to providing a manner for establishing a mapping between REs in each eREG and antenna ports, this embodiment designs a mapping relationship between REs in different eREGs in the PRB pair and antenna ports. For example, it may be specified that REs that have a same logical index but belong to different eREGs correspond to a same antenna port.

As an example, nine REs that are shown in FIG. 3 as being shaded with vertical lines belong to an eREG other than the aforementioned eREG, and logical indexes of the nine REs are also shown in FIG. 3. For ease of description, the aforementioned eREG shown as being shaded with diagonal lines is referred to as a first eREG, and the current eREG shown as being shaded with vertical lines is referred to as a second eREG. As can be seen from FIG. 3, REs with a same logical index are mapped to a same antenna port. For example, a diagonally shaded box $A_1$ and $A_1$ shown by a vertically shaded box $A_1$ represent two different REs, the two REs have a same logical index in their respective eREGs, and are mapped to a same antenna port, that is, the antenna port A.

Embodiment 3

In this embodiment, a mapping manner of REs in each eREG in the PRB pair is the same as described in Embodiment 2. A main difference between the two embodiments lies in that in this embodiment, REs that have a same logical index but belong to different eREGs are on a preset rotating cycle according to an order of logical indexes of eREGs. The rotating cycle is not limited in this embodiment, and may be set based on actual circumstances. For example, the rotating cycle is 1, 2, or the like.

For example, referring to FIG. 4, FIG. 4 shows an antenna port mapping table in still another embodiment of a method for establishing a mapping between an enhanced downlink control channel resource and an antenna port according to the present invention. Turning now to the concept of a logical index of an eREG, the PRB pair is divided into different eREGs, and similar to the foregoing logical indexes of REs, logical indexes of eREGs are used to specify a logical order of multiple eREGs, such as eREG indexes "G1, G2, G3, . . . , and G8" in FIG. 4, where each eREG index corresponds to one eREG.

In this embodiment, different REs located in a same OFDM symbol generally belong to different eREGs. For example, four REs located in the first OFDM symbol on the left in a time domain in FIG. 4 belong to eREGs G1, G2, G3, and G4 respectively. However, logical indexes of the four REs "$A_1$, $B_1$, $A_1$, and $B_1$" in respective eREGs are the same, specifically, their logical indexes of the REs are all 1. As can be seen from FIG. 4, the four REs correspond to different eREG indexes, the REs are arranged in a sequence according to their eREG indexes "G1, G2, G3, and G4", and antenna ports are in rotation for each RE, specifically, the rotation pattern is "A, B, A, B". The rotating cycle in FIG. 4 is 1, which means that corresponding antenna ports change on a per-eREG basis.

Similarly, a mapping manner of "$B_2$, $A_2$, $B_2$, and $A_2$" (corresponding to G5, G6, G7, and G8, respectively) in FIG. 4 is the same as the foregoing mapping manner, where A1 corresponding to G1 and B2 corresponding to G5 belong to a same eREG, B1 corresponding to G2 and A2 corresponding to G6 belong to a same eREG, A1 corresponding to G3 and B2 corresponding to G7 belong to a same eREG, and B1 corresponding to G4 and A2 corresponding to G8 belong to a same eREG. In this embodiment, only some REs are shown in FIG. 4 to describe the mapping manner, and antenna ports corresponding to other REs are not shown in FIG. 4, but mapping manners thereof are the same as the foregoing manner, and are all determined already.

For another example, referring to FIG. 5, FIG. 5 shows an antenna port mapping table in still another embodiment of a method for establishing a mapping between an enhanced downlink control channel resource and an antenna port according to the present invention, where A1 corresponding to G1 and B2 corresponding to G5 belong to a same eREG, A1 corresponding to G2 and B2 corresponding to G6 belong to a same eREG, B1 corresponding to G3 and A2 corresponding to G7 belong to a same eREG, and B1 corresponding to G4 and A2 corresponding to G8 belong to a same eREG. In FIG. 5, similarly, antenna ports corresponding to REs that have a same logical index but belong to different eREGs are on a preset rotating cycle according to an order of eREG indexes; and a difference between FIG. 5 and FIG. 4 lies in that the rotating cycle is 2.

In the foregoing Embodiment 2, a mapping relationship between each RE in an enhanced downlink control channel resource and an antenna port is set according to a logical index of the RE. In the foregoing Embodiment 3, a change in a mapping relationship between REs in different eREGs in the enhanced downlink control channel resource and antenna ports is further designed, for example, the foregoing rotating cycle of antenna ports corresponding to REs in different eREGs. The efforts to explicitly define a manner for establishing a mapping between an RE in an enhanced downlink control channel resource and an antenna port proves advantageous in meeting requirements of downlink control data transmission on an ePDCCH in LTE.

The following embodiments describe how to design a mapping relationship between an RE and an antenna port according to a physical index. Design according to physical index is more convenient than design according to logical index, and can simplify processing during transmission of downlink control data. The following will start with describing an advantage of design according to physical index over design according to logical index, and then goes further to elaborate a mapping manner designed according to a physical index:

For example, returning briefly to FIG. 1; it is assumed that: the three REs REa, REb, and REc belong to a same eREG (other REs in the eREG are not shown); in one downlink subframe, some control data is carried in the three REs, the REa corresponds to an antenna port A, the REb corresponds to an antenna port B, and the REc corresponds to an antenna port C.

Assuming that a frame structure of another downlink subframe changes such that the REa moves to a location of REaa, the prior art proposes that the REaa and the REa correspond to a same antenna port, that is to say, the REaa still corresponds to the antenna port A. In the prior art, antenna port mapping is bound to an eREG, and no matter whatever location an RE in the eREG moves to, the antenna port mapping remains unchanged. A drawback in the prior art is that each RE in a resource grid unit shown in FIG. 1 may correspond to a different antenna port when a different frame structure is in use. If all REs in the entire resource grid need to be mapped to antenna ports, both a transmit end and a receive end need to store multiple antenna port mapping tables corresponding to different frame structures, and process the different frame structures according to the different mapping tables, thereby increasing processing complexity.

In this embodiment, however, a fixed mapping is established between each resource element and an antenna port. For example, it is predetermined that the REa corresponds to the antenna port A, and the REaa corresponds to the antenna port B. Herein, names of the REa and REaa are not intended to imply their respective eREG. Rather, the REa refers to a grid unit in FIG. 1 at which the second OFDM symbol from left to right in a time domain and the third subcarrier from bottom to top in a frequency domain intersect, and the REaa refers to a grid unit in FIG. 1 at which the second OFDM symbol from left to right in the time domain and the first subcarrier from bottom to top in the frequency domain intersect. Assuming that in an eREG in which the REa, the REb, and the REc are originally located, the REa corresponds to the antenna port A. Then, the frame structure changes such that the resource element REa included in the eREG moves to a location of the REaa, where the REaa corresponds to the antenna port B. In this case, the REaa still belongs to the original eREG, but the antenna port corresponding to the REaa needs to be redetermined according to antenna port mapping at the new location.

It can be learned from the foregoing description that in this embodiment, in an established mapping between each RE and an antenna port, an RE that corresponds to a fixed location in the time domain and in the frequency domain is bound to an antenna port, and the mapping does not change along with an eREG. A significant advantage of this is that: a transmit end and a receive end only need to store one antenna port mapping table, and do not need to store multiple mapping tables that correspond to different frame structures. Because an RE at a fixed location is already bound to an antenna port, even after a frame structure changes, an antenna port of each RE in an eREG in a new frame structure is also determined according to the antenna port mapping table, and a mapping between the RE and the antenna port do not change any more, thereby greatly reducing processing complexity at the transmit end and the receive end.

Embodiment 4

FIG. 6 shows an antenna port mapping table in still another embodiment of a method for establishing a mapping between an enhanced downlink control channel resource and an antenna port according to the present invention. In this embodiment, a mapping between an RE and an antenna port is determined according to a physical index; specifically, in this embodiment, the mapping is determined according to an OFDM symbol index in a time domain, where the OFDM symbol index is a type of physical index.

An OFDM symbol index in the time domain serves a similar purpose as a logical index of RE, a subcarrier index, or the like, and the indexes are all used to specify a logical order, where the OFDM symbol index is used to specify a logical order of multiple OFDM symbols divided in the time domain. As shown in FIG. 6, OFDM symbol indexes are "T1, T2, T3, . . . , and T8".

In this embodiment, the mapping between an RE and an antenna port is irrelevant to eREGs in the PRB pair, and REs in the eREGs are mapped according to OFDM symbol indexes in the time domain, regardless of where the REs in the eREGs are located in the time domain and a frequency domain. A specific mapping manner is that antenna ports corresponding to all REs included in a same OFDM symbol are the same; and antenna ports corresponding to REs in different OFDM symbols are on a preset rotating cycle according to an order of OFDM symbol indexes in the time domain.

A rotating cycle being 1 is used as an example in FIG. 6, where all REs in an OFDM symbol corresponding to an OFDM symbol index T1, that is, the first column of REs on the left in FIG. 6, correspond to an antenna port A; and REs in multiple OFDM symbols, for example, REs in OFDM symbols corresponding to T1 to T8, antenna ports corresponding to REs of different OFDM symbols are in rotation according to an order of the OFDM symbol indexes "T1, T2, ..., and T8"; for example, the REs in the OFDM symbol corresponding to T1 all correspond to the antenna port A, REs in the OFDM symbol corresponding to T2 all correspond to an antenna port B, and REs in the OFDM symbol corresponding to T3 all correspond to the antenna port A, ..., and so on.

It should be noted that in this embodiment, the rotating cycle being 1 is merely an example, and in a specific implementation, the rotating cycle may also be 2, 3, or the like. For example, when the rotating cycle is 2, all the REs in the OFDM symbols corresponding to T1 and T2 may be set to correspond to the antenna port A, all the REs in the OFDM symbols corresponding to T3 and T4 may be set to correspond to the antenna port B, and so on. In addition, in this embodiment, the rotation is performed only in an order of "T1, T2, ..., and T8". Apparently, the rotation may also be performed in an order of "T8, T7, ..., and T1".

Embodiment 5

Based on Embodiment 4 in which a mapping is determined according to OFDM symbol indexes in a time domain, this embodiment cyclically shifts mapped antenna ports in a frequency domain. In other words, a cyclic shift is performed for antenna ports corresponding to multiple resource elements corresponding to some subcarrier indexes in the frequency domain.

FIG. 7 is a schematic diagram depicting a cyclic shift of antenna ports in still another embodiment of a method for establishing a mapping between an enhanced downlink control channel resource and an antenna port according to the present invention. To describe how antenna ports are cyclically shifted in the time domain, multiple resource elements corresponding to a subcarrier index S2 in the frequency domain are used as an example. Assuming that a cyclic shift (an REx for carrying a reference signal does not participate in the shift, and a location of the REx is fixed) is performed for antenna ports corresponding to a row of REs (briefly referred to as an RE row hereinafter) that corresponds to the subcarrier index S2, where each antenna port corresponding to the REs corresponding to the subcarrier index S2 are moved leftward by one OFDM symbol, and an ellipse in FIG. 7 shows the direction of the cyclic shift. It can be seen that A located on the leftmost side is moved out of its resource grid unit to the rightmost side of the RE row; an antenna port B at a location of the rightmost RE is moved leftward by one OFDM symbol to make room for the foregoing A that is moved out of the leftmost side.

Referring to FIG. 8, FIG. 8 shows an antenna port mapping table in still another embodiment of a method for establishing a mapping between an enhanced downlink control channel resource and an antenna port according to the present invention, where the antenna port mapping table is obtained after the foregoing cyclic shift in FIG. 7 is performed. It can be seen that compared with the antenna port mapping table before the shift is performed in FIG. 7, in the new mapping table, the whole RE row corresponding to the subcarrier index S2 is moved leftward by OFDM symbol. For example, after the cyclic shift, the antenna port B corresponds to the RE that corresponds to the OFDM symbol index T1 and the subcarrier index S2, while before the shift is performed, the antenna port A in FIG. 6 corresponds to the RE. In addition, it can further be seen from FIG. 8 that in the resource grid, RE rows corresponding to subcarrier indexes S4, S6, S8, and the like also undergo a same cyclic shift as the RE row corresponding to S2.

It should be noted that in the example of the foregoing FIG. 7 and FIG. 8, an RE row is moved leftward by one OFDM symbol; however, and in a specific implementation, the pattern of movement is not limited thereto. For example, an RE row may be moved rightward, and the RE row may be moved by two OFDM symbols, three OFDM symbols, or the like. In addition, in FIG. 8, a cyclic shift is performed at an interval of one subcarrier in the frequency domain, for example, a cyclic shift is performed for RE rows corresponding to the subcarrier indexes S2, S4, S6, and S8. In a specific implementation, an RE row that needs to be cyclically shifted may be selected in another manner, for example, only S2, S3, and S8 may be selected for a cyclic shift, or S6 and S7 are selected for a cyclic shift, or the like.

Embodiment 6

FIG. 9 shows an antenna port mapping table in still another embodiment of a method for establishing a mapping between an enhanced downlink control channel resource and an antenna port according to the present invention. In this embodiment, a mapping between an RE and an antenna port is determined according to a physical index; specifically, in this embodiment, the mapping is determined according to a subcarrier index in a frequency domain, where the subcarrier index is a type of physical index.

In this embodiment, the mapping between an RE and an antenna port is irrelevant to eREGs in the PRB pair, and REs in the eREGs are mapped according to subcarrier indexes in the frequency domain, regardless of where the REs in the eREGs are located in a time domain and the frequency domain. A specific mapping manner is that antenna ports corresponding to multiple REs that correspond to a same subcarrier index are the same; and antenna ports corresponding to REs that correspond to different subcarrier indexes are on a preset rotating cycle according to an order of subcarrier indexes in the frequency domain.

A rotating cycle being 3 is used as an example in FIG. 9, where antenna ports corresponding to all REs in an RE row that corresponds to a subcarrier index are the same, for example, all REs corresponding to a subcarrier index S1 are mapped to an antenna port A, all REs corresponding to a subcarrier index S4 are mapped to an antenna port B, and so on. In addition, according to the rotating cycle 3, all REs in RE rows corresponding to the subcarrier index S1, a subcarrier index S2, and a subcarrier index S3 correspond to the antenna port A, and all REs in RE rows corresponding to the subcarrier index S4, a subcarrier index S5, and a subcarrier index S6 correspond to the antenna port B. This is equivalent to changing corresponding antenna ports at a frequency of every three subcarriers.

Similarly, in the example of this embodiment, the rotating cycle is 3; however, in a specific implementation, the rotating cycle may also be 1, 2, or the like. For example, when the rotating cycle is 2, all the REs in the RE rows corresponding to the subcarrier indexes S1 and S2 may be set to correspond to the antenna port A, all the REs in the RE rows corresponding to the subcarrier indexes S3 and S4 may be set to correspond to the antenna port B, and so on. In addition, in this embodiment, the rotation is performed only in an order of "S1, S2, ..., and S8". Apparently, the rotation may also be performed in an order of "S8, S7, ..., and S1".

Embodiment 7

Based on Embodiment 6 in which a mapping is determined according to subcarrier indexes in a frequency domain, this embodiment cyclically shifts mapped antenna ports in a time domain. In other words, a cyclic shift is performed for antenna ports corresponding to multiple resource elements corresponding to some OFDM symbol indexes in the time domain.

Figure 10:
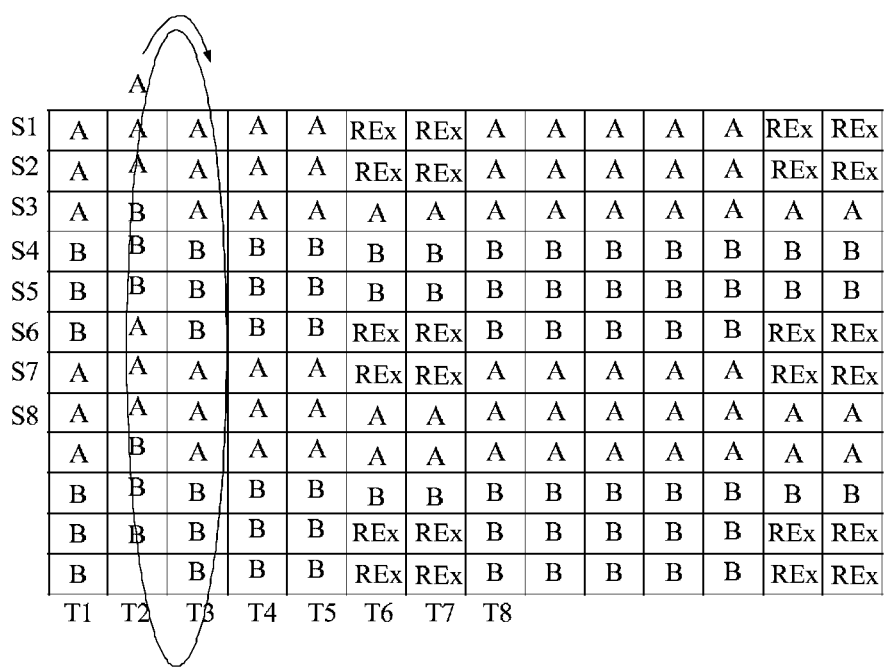
FIG. 10 is a schematic diagram depicting a cyclic shift of antenna ports in still another embodiment of a method for establishing a mapping between an enhanced downlink control channel resource and an antenna port according to the present invention.

FIG. 10 is a schematic diagram of an antenna port cyclic shift in still another embodiment of a method for establishing a mapping between an enhanced downlink control channel resource and an antenna port according to the present invention. To describe how antenna ports are cyclically shifted in the frequency domain, all REs in an OFDM symbol that corresponds to an OFDM symbol index T2 in the time domain are used as an example. Assuming that a cyclic shift is performed for antenna ports corresponding to all the REs in the OFDM symbol that corresponds to the OFDM symbol index T2, where all the REs in the OFDM symbol are moved upward by one subcarrier, and an ellipse in FIG. 10 shows the direction of the cyclic shift. It can be seen that A located on the top side is moved out of its resource grid unit to the bottom of the OFDM symbol; an antenna port B at a location of the bottom RE is moved upward by one subcarrier to make room for the foregoing A that is moved out of the top RE.

Referring to FIG. 11, FIG. 11 shows an antenna port mapping table in still another embodiment of a method for establishing a mapping between an enhanced downlink control channel resource and an antenna port according to the present invention, where the antenna port mapping table is obtained after the foregoing cyclic shift in FIG. 10 is performed. It can be seen that compared with the antenna port mapping table before the shift in FIG. 10 is performed, in the new mapping table, the whole OFDM symbol corresponding to the OFDM symbol index T2 is moved upward by one subcarrier. For example, after the cyclic shift, the antenna port B corresponds to an RE corresponding to the OFDM symbol index T2 and a subcarrier index S3, while before the shift is performed, the antenna port A in FIG. 9 corresponds to the RE. In addition, it can further be seen from FIG. 11 that in the resource grid, OFDM symbols corresponding to OFDM symbol indexes T4, T6, T8, and the like undergo a same cyclic shift as the OFDM symbol corresponding to T2.

It should be noted that in the example of the foregoing FIG. 10 and FIG. 11, REs in an OFDM symbol are moved up by one subcarrier; however, in a specific implementation, the pattern of movement is not limited thereto. For example, shifters in an OFDM symbol may be moved to the bottom, and the REs may be moved by two subcarriers, three subcarriers, or the like. In addition, in FIG. 11, a cyclic shift is performed at an interval of every one OFDM symbol in the time domain, for example, a cyclic shift is performed for REs corresponding to the OFDM symbol indexes T2, T4, T6, and T8. In a specific implementation, OFDM symbols that need to be cyclically shifted may be selected in another manner, for example, only T2, T3, and T8 may be selected for a cyclic shift, or T6 and T7 are selected for a cyclic shift, or the like.

In each of the foregoing several embodiments, a manner for establishing a mapping between an RE in one PRB pair and an antenna port is described. The following will discuss a method of mapping between REs in different PRB pairs on a distributed e-PDCCH and antenna ports, where the distributed downlink control channel includes multiple PRB pairs.

First, a structure of a downlink control channel resource on a distributed e-PDCCH is described. Referring to the description in FIG. 1, it may be seen that each OFDM symbol includes multiple PRB pairs in the frequency domain, and the downlink control channel may use resources of only one of the PRB pairs, or may use resources of multiple of the PRB pairs. FIG. 12 is a schematic diagram depicting distribution of PRB pairs in still another embodiment of a method for establishing a mapping between an enhanced downlink control channel resource and an antenna port according to the present invention. As shown in FIG. 12, in each OFDM symbol, each of multiple PRB pairs in the frequency domain has a physical index, and the physical index may be used to specify an order in which the multiple PRB pairs are distributed in the frequency domain, for example, an order of "N, N+1, N+2, . . . , and N+7" shown in FIG. 12. The multiple PRB pairs are distributed sequentially in the frequency domain in order of the physical indexes.

Each of the multiple PRB pairs may further has a logical index, where the logical index is a logical number that is allocated when some of the PRB pairs are configured for the e-PDCCH as a downlink control channel resource, and is used to indicate a logical order of these PRB pairs; and the logical index is irrelevant to the foregoing physical index. For example, referring to FIG. 12, assuming that PRB pairs that have physical indexes of "N+1, N+3, N+5, and N+7" are configured for the e-PDCCH, logical indexes of the four PRB pairs may be set to "(1), (2), (3), and (4)". Apparently, the physical indexes are irrelevant to the logical indexes. The logical indexes of the four PRB pairs may also be set to "(1), (3), (2), and (4)" shown in FIG. 13. FIG. 13 is a schematic diagram depicting distribution of PRB pairs in still another embodiment of a method for establishing a mapping between an enhanced downlink control channel resource and an antenna port according to the present invention.

FIG. 14 is a schematic diagram depicting distribution of PRB pairs in still another embodiment of a method for establishing a mapping between an enhanced downlink control channel resource and an antenna port according to the present invention. FIG. 14 shows an alternative manner in which it is assumed that PRB pairs with physical indexes of "N+1, N+4, N+5, and N+7" are configured for an e-PDCCH and logical indexes corresponding to the PRB pairs are "(1), (3), (2), and (4)", respectively.

Based on the foregoing description regarding distribution of multiple PRB pairs, the following will describe a design of a manner for establishing a mapping between REs in the multiple PRB pairs and antenna ports. In the following discussion, a quantity of antenna ports is assumed to be two.

Embodiment 8

An antenna port mapping manner of multiple PRB pairs provided in this embodiment is that: for each of the multiple PRB pairs, a mapping between REs in the PRB pair and antenna ports is performed in a same way as described in the foregoing embodiments of establishing a mapping between REs in one PRB pair and antenna ports; and mapping manners are identical for the PRB pairs.

For example, among the four PRB pairs "N+1, N+3, N+5, and N+7" allocated to an e-PDCCH, each PRB pair uses an antenna port mapping table shown in FIG. 8.

Embodiment 9

An antenna port mapping manner of multiple PRB pairs provided in this embodiment is that: a mapping between REs in a same PRB pair and antenna ports is performed in a same way as described in the foregoing embodiments; antenna ports corresponding to REs at corresponding locations in different PRB pairs are on a preset rotating cycle according to an order of physical indexes of the PRB pairs in a frequency domain.

For example, referring to structures shown in FIG. 12 and FIG. 13, if it is assumed that the rotating cycle is 1, mapping manners of the four PRB pairs are still identical even after they are allocated to an e-PDCCH. For example, all of the four PRB pairs use an antenna port mapping table shown in FIG. 8. Considering that the rotating cycle is 1 and physical indexes are in an order of "N, N+1, N+2 . . . N+8", a mapping manner of a PRB pair corresponding to the physical index N+2 is different from that of a PRB pair corresponding to the physical index N+1, and a mapping manner of a PRB pair corresponding to the physical index N+4 is different from that of a PRB pair corresponding to the physical index N+3; but a mapping manner of the PRB pair corresponding to the physical index N+1 is the same as that of the PRB pair corresponding to the physical index N+3, and a mapping manner of the PRB pair corresponding to the physical index N+2 is the same as that of the PRB pair corresponding to the physical index N+4.

The REs at corresponding locations in different PRB pairs refer to REs that belong to different PRB pairs but have a same time-frequency location in their respective PRB pair, for example, REs in each PRB pair that correspond to a location at which an OFDM symbol index T2 and a subcarrier index S3 intersect. Such an RE is the "RE at a corresponding location". An example of the rotation is that, an RE at a location in the PRB pair with the physical index N+1 corresponds to an antenna port A, an RE at a corresponding location in the PRB pair with the physical index N+2 corresponds to an antenna port B, and an RE at a corresponding location in the PRB pair with the physical index N+3 corresponds to the antenna port A again.

Referring to a structure shown in FIG. 14, it may be easy to learn from the foregoing principle that PRB pairs corresponding to physical indexes N+1, N+5, and N+7 have a same RE mapping manner, and the PRB pair corresponding to N+4 has a different RE mapping manner than the PRB pair corresponding to N+1.

The rotating cycle being 1 is only an example. In a specific implementation, the rotating cycle may be another value. For another example, assuming that the rotating cycle is 2,
referring to the structures shown in FIG. 12 and FIG. 13, REs in the PRB pairs corresponding to the physical indexes N+1 and N+5 are mapped to a same antenna port, and REs in the PRB pairs corresponding to the physical indexes N+3 and N+7 are mapped to a same antenna port; but the mapping manners of the two groups of PRB pairs are different, for example, the REs in the PRB pairs corresponding to the physical indexes N+3 and N+5 are mapped to different antenna ports, which means that antenna ports are in rotation. For example, from each of the PRB pairs corresponding to the physical indexes N+3 and N+5, an RE corresponding to the location at which the OFDM symbol index T2 and the subcarrier index S3 intersect is selected for comparison. If the RE in the PRB pair corresponding to N+3 corresponds to the antenna port A, the RE in the PRB pair corresponding to N+5 corresponds to the antenna port B. Similarly, referring to the structure shown in FIG. 14, REs in the PRB pairs corresponding to the physical indexes N+1 and N+5 are mapped to a same antenna port, REs at the corresponding locations in the PRB pairs corresponding to the physical indexes N+4 and N+7 are mapped to different antenna ports.

Embodiment 10

Both Embodiment 9 and this embodiment provides an antenna port mapping manner for multiple PRB pairs. A difference lies in that in Embodiment 9, antenna ports are in rotation according to physical indexes of PRB pairs, but in this embodiment, antenna ports are in rotation according to logical indexes of PRB pairs. Antenna ports corresponding to REs at corresponding locations in different PRB pairs are on a preset rotating cycle according to an order of logical indexes of the PRB pairs. A rotation principle is the same as in Embodiment 9, and is briefly described in this embodiment.

For example, assuming that the rotating cycle is 1: referring to the structure shown in FIG. 12, a PRB pairs corresponding to a physical index N+1 and a logical index (1) and a PRB pair corresponding to a physical index N+5 and a logical index (3) have a same antenna port mapping, and a PRB pairs corresponding to a physical index N+3 and a logical index (2) and a PRB pair corresponding to a physical index N+7 and a logical index (4) have a same antenna port mappings, that is to say, REs at a corresponding location in the two PRB pairs are mapped to the same antenna ports; referring to the structure shown in FIG. 13, a PRB pairs corresponding to a physical index N+1 and a logical index (1) and a PRB pair corresponding to a physical index N+3 and a logical index (3) have a same antenna port mapping, and a PRB pairs corresponding to a physical index N+5 and a logical index (2) and a PRB pair corresponding to a physical index N+7 and a logical index (4) have a same antenna port mappings, that is to say, REs at a corresponding location in the two PRB pairs are mapped to the same antenna ports.

For another example, assuming that the rotating cycle is 2: referring to the structure shown in FIG. 12, the PRB pairs corresponding to the physical index N+1 and the logical index (1) and the PRB pair corresponding to the physical index N+3 and the logical index is (2) have a same antenna port mapping, and the PRB pairs corresponding to the physical index N+5 and the logical index (3) and a PRB pair corresponding to the physical index N+7 and the logical index (4) have a same antenna port mappings, that is to say, REs at a corresponding location in the two PRB pairs are mapped to the same antenna ports; referring to the structure shown in FIG. 14, a PRB pairs corresponding to a physical index N+1 and a logical index is (1) and a PRB pair corresponding to a physical index N+4 and a logical index (3) have different antenna port mapping, and a PRB pairs corresponding to a physical index N+5 and a logical index (2) and a PRB pair corresponding to a physical index N+7 and a logical index (4) have different antenna port mappings, that is to say, REs at a corresponding location in the two PRB pairs are mapped to different antenna ports.

It should be noted that in the foregoing embodiments of the present invention, it is assumed that one subframe includes 14 OFDM symbols and two antenna ports participate in mapping, for example, an RE corresponds to an antenna port A, or corresponds to an antenna port B. However, in a specific implementation, a mapping manner is not limited thereto, and variations thereof may also be made. For example, the solutions of the embodiments of the present invention may also be applicable when one subframe includes 12 OFDM symbols; a quantity of antenna ports that participate in mapping may be three, or four, or the like, and a mapping principle is similar to when there are two antenna ports participating in mapping. For example, in the event that antenna ports are in rotation, if a port A and port B are used in one PRB pair, then in another PRB pair, the port A is changed to a port C, and the port B is changed to a port D, and vice versa.

FIG. 15 shows an antenna port mapping table in still another embodiment of a method for establishing a mapping between an enhanced downlink control channel resource and an antenna port according to the present invention. In FIG. 15, as an example, four antenna ports participate in mapping, and antenna ports corresponding to REs of OFDM symbols are in rotation according to an order of the OFDM symbols in a time domain. For details about a mapping principle, refer to the mapping manner involving two ports, and no additional example is provided herein to explain the mapping manner involving four ports. For example, in the case that resource elements are distributed among multiple PRB pairs, antenna ports corresponding to REs at a corresponding location in different PRB pairs are in rotation. If four ports participate in the rotation, for example, it may be set that an antenna port A originally corresponding to an RE is changed to an antenna port C, an antenna port B originally corresponding to an RE is changed to an antenna port D, the antenna port C originally corresponding to an RE is changed to the antenna port A, and the antenna port D originally corresponding to an RE is changed to the antenna port B.

Embodiment 11

FIG. 16 is a schematic structural diagram illustrating an embodiment of an apparatus for establishing a mapping between an enhanced downlink control channel resource and an antenna port according to the present invention. The apparatus can perform a method in any embodiment of the present invention. The mapping apparatus can be applied to a control data sending apparatus, such as a base station, and can also be applied to a control data receiving apparatus, such as a terminal. As shown in FIG. 16, the apparatus may include a resource mapping unit 1601 and a data mapping unit 1602, where the resource mapping unit 1601 is configured to establish a mapping between each resource element in an enhanced downlink control channel resource and an antenna port; and the data mapping unit 1602 is configured to establish a correspondence between control data carried by the resource element and an antenna port corresponding to the resource element, so as to send or receive, according to a reference signal corresponding to the antenna port, the control data carried by the resource element.

Further, a resource block pair PRB pair in the enhanced downlink control channel resource includes multiple resource element groups, and each of the resource element groups includes multiple resource elements; and the resource mapping unit 1601 is specifically configured to set that antenna ports corresponding to the resource elements in each resource element group are in rotation according to an order of logical indexes of the multiple resource elements.

Further, the resource mapping unit 1601 is further configured to: resource elements that have a same logical index but belong to different resource element groups correspond to a same antenna port.

Further, the resource mapping unit 1601 is further configured to set that antenna ports corresponding to resource elements that have a same logical index but belong to different resource element groups are on a preset rotating cycle according to an order of logical indexes of the resource element groups.

Further, one resource block pair PRB pair in the enhanced downlink control channel resource includes multiple orthogonal frequency division multiplexing OFDM symbols in a time domain, each of the OFDM symbols includes multiple resource elements, and each of the resource elements corresponds to a subcarrier in a frequency domain; and the resource mapping unit 1601 is specifically configured to determine a mapping between the resource element and an antenna port according to a physical index, where the physical index includes an OFDM symbol index corresponding to the OFDM symbol, and a subcarrier index corresponding to the subcarrier.

FIG. 17 is a schematic structural diagram illustrating another embodiment of an apparatus for establishing a mapping between an enhanced downlink control channel resource and an antenna port according to the present invention. As shown in FIG. 17, the apparatus is based on the structure shown in FIG. 16. Further, the resource mapping unit 1601 may include any one or more of: a first mapping subunit 1603, a second mapping subunit 1604, a third mapping subunit 1605, and a fourth mapping subunit 1606;

the first mapping subunit 1603 is configured to set that for each OFDM symbol, antenna ports corresponding to all resource elements included in the OFDM symbol are the same; and for the multiple OFDM symbols, antenna ports corresponding to resource elements in different OFDM symbols are on a preset rotating cycle according to an order of OFDM symbol indexes in the time domain;

the second mapping subunit 1604 is configured to: after processing performed by the first mapping subunit, set that a cyclic shift is performed for antenna ports corresponding to multiple resource elements corresponding to some subcarrier indexes in the frequency domain;

the third mapping subunit 1605 is configured to set that antenna ports corresponding to multiple resource elements that correspond to a same subcarrier index are the same; and antenna ports corresponding to different resource elements that correspond to different subcarrier indexes are on a preset rotating cycle according to an order of the subcarrier indexes in the frequency domain; and the fourth mapping subunit 1606 is configured to: after processing performed by the third mapping subunit, set that a cyclic shift is performed for antenna ports multiple resource elements corresponding to some OFDM symbol indexes in the time domain.

Further, the enhanced downlink control channel resource includes multiple PRB pairs; and the resource mapping unit 1601 is configured to perform, for each of the PRB pairs, the step of establishing a mapping between each resource element in an enhanced downlink control channel resource and an antenna port; and is further configured to set that the multiple PRB pairs have a same mapping between the resource element and an antenna port.

Further, the enhanced downlink control channel resource includes multiple PRB pairs; and the resource mapping unit 1601 is configured to perform, for each of the PRB pairs, the step of establishing a mapping between each resource element in an enhanced downlink control channel resource and an antenna port; and is further configured to set that the multiple PRB pairs, antenna ports corresponding to resource elements at corresponding locations in different PRB pairs are on a preset rotating cycle according to an order of physical indexes or logical indexes of the PRB pairs.

Embodiment 12

Figure 18:
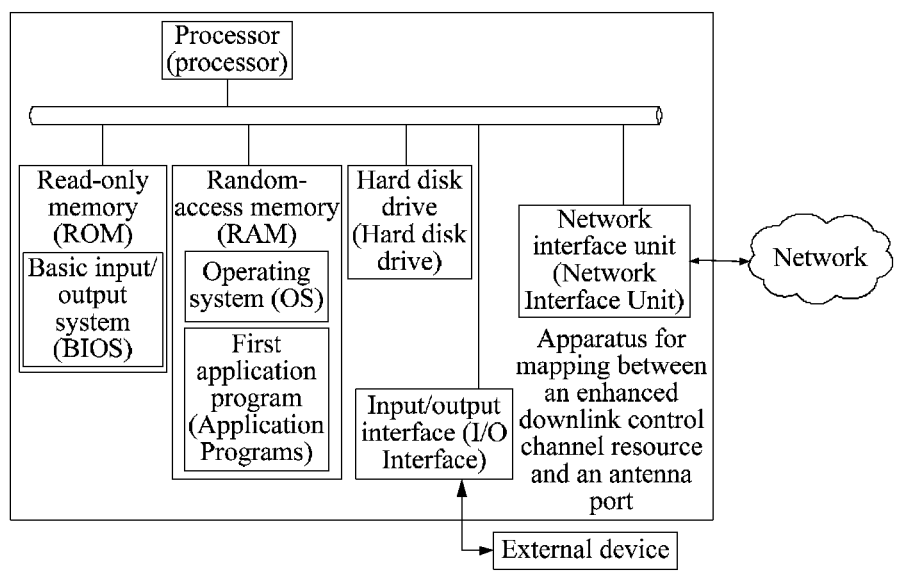
FIG. 18 is a structural diagram of entities of an embodiment of an apparatus for establishing a mapping between an enhanced downlink control channel resource and an antenna port according to the present invention.

FIG. 18 is an entity structure diagram of an embodiment of an apparatus for establishing a mapping between an enhanced downlink control channel resource and an antenna port according to the present invention. The mapping apparatus includes at least one processor, and a memory connected to the at least one processor. For brevity, in FIG. 18, description is provided by using an example in which there is only one processor and the memory is a random access memory (random access memory, RAM for short).

The processor is configured to establish a mapping between each resource element in an enhanced downlink control channel resource and an antenna port, and establish a correspondence between control data carried by the resource element and an antenna port corresponding to the resource element; and the memory is configured to store the mapping established between each resource element and an antenna port by the processor and the correspondence established between the control data and an antenna port by the processor.

The processor may further be configured to perform the steps in the method embodiments, and details are not described herein again.

A person of ordinary skill in the art can understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for establishing a mapping between an enhanced downlink control channel resource and an antenna port, comprising:
   establishing a mapping between each resource element carrying control data in an enhanced downlink control channel resource and an antenna port, wherein
      the enhanced downlink control channel resource comprises multiple resource block pairs (PRB pairs), each of the multiple PRB pairs comprises multiple orthogonal frequency division multiplexing (OFDM) symbols in a time domain, and each of the multiple OFDM symbols corresponds to an OFDM symbol index, wherein
      each of the multiple PRB pairs further comprises multiple subcarriers in a frequency domain, and each of the multiple subcarriers corresponds to a subcarrier index, wherein
      resource elements carrying control data in odd-indexed OFDM symbols and odd-indexed subcarriers being mapped to a first antenna port,
      resource elements carrying control data in odd-indexed OFDM symbols and even-indexed subcarriers being mapped to a second antenna port,
      resource elements carrying control data in even-indexed OFDM symbols and even-indexed subcarriers being mapped to the first antenna port, and
      resource elements carrying control data in even-indexed OFDM symbols and odd-indexed subcarriers being mapped to the second antenna port; and
   sending, according to a reference signal corresponding to the first antenna port or the second antenna port, the control data carried by the resource element, wherein establishing the mapping between each resource element in the enhanced downlink control channel resource and the first antenna port or second antenna port is performed by each of the multiple PRB pairs, wherein the multiple PRB pairs have a same mapping between the resource element and the first antenna port or second antenna port.

2. The method for establishing a mapping between an enhanced downlink control channel resource and an antenna port according to claim 1, wherein establishing the mapping between each resource element in the enhanced downlink control channel resource and the first antenna port or second antenna port is performed by each of the multiple PRB pairs, each of the multiple PRB pairs corresponds to a PRB pair index, and the first antenna port or second antenna port mapped to the resource element in odd-indexed PRB pairs is opposite to that in even-indexed PRB pairs.

3. An apparatus, comprising:
   at least one processor, configured to establish a mapping between each resource element carrying control data in an enhanced downlink control channel resource and an antenna port; and
   a transmitter, configured to transmit the control data carried by the resource element according to a reference signal corresponding to the first antenna port or the second antenna port,
   wherein
      the enhanced downlink control channel resource comprises multiple resource block pairs (PRB pairs), each of the multiple PRB pairs comprises multiple orthogonal frequency division multiplexing (OFDM) symbols in a time domain, and each of the multiple OFDM symbols corresponds to an OFDM symbol index, wherein
      each of the multiple PRB pairs further comprises multiple subcarriers in a frequency domain, and each of the multiple subcarriers corresponds to a subcarrier index, wherein
      resource elements carrying control data in odd-indexed OFDM symbols and odd-indexed subcarriers being mapped to a first antenna port,
      resource elements carrying control data in odd-indexed OFDM symbols and even-indexed subcarriers being mapped to a second antenna port,
      resource elements carrying control data in even-indexed OFDM symbols and even-indexed subcarriers being mapped to the first antenna port, and
      resource elements carrying control data in even-indexed OFDM symbols and odd-indexed subcarriers being mapped to the second antenna port,
   wherein the at least one processor is further configured to establish a mapping between each resource element in the enhanced downlink control channel resource and the first antenna port or second antenna port on each of the multiple PRB pairs, wherein the multiple PRB pairs have a same mapping between the resource element and the first antenna port or second antenna port.

4. The apparatus according to claim 3, wherein the at least one processor is further configured to establish a mapping between each resource element in the enhanced downlink control channel resource and the first antenna port or second antenna port on each of the multiple PRB pairs, wherein
each of the multiple PRB pairs corresponds to a PRB pair index, and the first antenna port or second antenna port mapped to the resource element in odd-indexed PRB pairs is opposite to that in even-indexed PRB pairs.

* * * * *